(12) United States Patent
Teng

(10) Patent No.: US 6,810,488 B2
(45) Date of Patent: Oct. 26, 2004

(54) ADAPTIVE SELECTIVE RETRANSMISSION OF PACKETS

(75) Inventor: Chia-Yuan Teng, San Diego, CA (US)

(73) Assignee: WebEx Communications, Inc., San Jose, CA (US)

( * ) Notice: Subject to any disclaimer, the term of this patent is extended or adjusted under 35 U.S.C. 154(b) by 568 days.

(21) Appl. No.: 09/863,218

(22) Filed: May 22, 2001

(65) Prior Publication Data

US 2003/0046601 A1 Mar. 6, 2003

(51) Int. Cl.[7] .......................... G06F 11/00; G01R 31/28
(52) U.S. Cl. .......................... 714/4; 370/216; 714/18
(58) Field of Search .......................... 714/4, 18, 20, 714/21, 27, 37, 47, 752, 786, 821; 370/216, 229, 432; 375/99, 102

(56) References Cited

U.S. PATENT DOCUMENTS

| | | | | |
|---|---|---|---|---|
| 5,222,080 A | * | 6/1993 | Wang et al. | 370/422 |
| 5,550,847 A | * | 8/1996 | Zhu | 714/748 |
| 6,104,757 A | * | 8/2000 | Rhee | 375/240.12 |
| 6,438,723 B1 | * | 8/2002 | Kalliojarvi | 714/751 |
| 6,445,717 B1 | * | 9/2002 | Gibson et al. | 370/473 |
| 6,463,460 B1 | * | 10/2002 | Simonoff | 709/203 |
| 6,594,798 B1 | * | 7/2003 | Chou et al. | 714/820 |

OTHER PUBLICATIONS

Yao Wang and Qin–Fan Ahu, "Error Control and Concealment for Video Communication: A Review", Proceedings of the IEEE, vol. 86, No. 5, May 1998, pp. 974–997.

* cited by examiner

Primary Examiner—Nadeem Iqbal
(74) Attorney, Agent, or Firm—Blakely, Sokoloff, Taylor & Zafman LLP

(57) ABSTRACT

A method for selectively retransmitting packets is disclosed. The method includes categorizing groups of packets in an order of importance. The order of importance is based on a scope of adverse impact that a loss of a particular group has on a quality of reconstructed original information. The method also includes selecting a subset of the groups of packets to be retransmitted. The selection is based on network condition parameters. The method further includes requesting retransmission of the subset of the groups of packets when a buffer occupancy condition is met.

20 Claims, 2 Drawing Sheets

ADAPTIVE SELECTIVE RETRANSMISSION OF PACKETS

BACKGROUND

The present invention relates to transmission of packets, and more particularly, to adaptive selective retransmission of such packets.

In a packet switched network, a message to be sent may be divided into blocks, or data packets, of fixed or variable length. The packets may then be sent individually over the network through multiple locations and reassembled at a final location before being delivered to a user at a receiving end. To ensure proper transmission and re-assembly of the blocks of data at the receiving end, various control data, such as sequence and verification information, is typically appended to each packet in the form of a packet header. At the receiving end, the packets are then reassembled and transmitted to an end user in a format compatible with the user's equipment.

A variety of packet switching protocols are available, and these protocols range in degree of efficiency and reliability. Transmission Control Protocol (TCP) is a reliable connection-oriented protocol for the Internet, which includes intelligence necessary to confirm successful transmission between sending and receiving ends in the network. According to TCP, each packet is marked in its header with a sequence number to allow the receiving end to properly reassemble the packets into the original message. The receiving end is then typically configured to acknowledge receipt of packets and expressly request the sending end to retransmit any lost packets.

In the Internet, loss of entire packets has been found to occur at a rate of over 20% when the network is very congested. The packet loss typically occurs one packet at a time. However, at times, multiple sequential packets in a row may be lost. In either case, a connection-oriented protocol such as TCP may introduce delay into packet transmission and degrade overall throughput, due to its need to request retransmission of these lost packets. Therefore, a need exists for an improved system of responding to and correcting packet loss errors with minimum delay.

SUMMARY

In one aspect, the present invention describes a method for selectively retransmitting packets. The method includes categorizing groups of packets in an order of importance. The order of importance is based on a scope of adverse impact that a loss of a particular group has on a quality of reconstructed original information. The method also includes selecting a subset of the groups of packets to be retransmitted. The selection is based on network condition parameters. The method further includes requesting retransmission of the subset of the groups of packets when a buffer occupancy condition is met.

In another aspect, a system for selectively retransmitting packets is described. The system includes a categorizer, a subset selector, and a buffer occupancy determining element. The categorizer receives groups of packets, and sorts the groups of packets in an order of importance. The subset selector receives each group of packets sorted in the order of importance, and determines whether a particular group is sufficiently important to be retransmitted. The buffer occupancy determining element generates a request to retransmit the particular group determined to be sufficiently important when buffer occupancy is greater than a threshold value.

DETAILED DESCRIPTION

Figure 1:
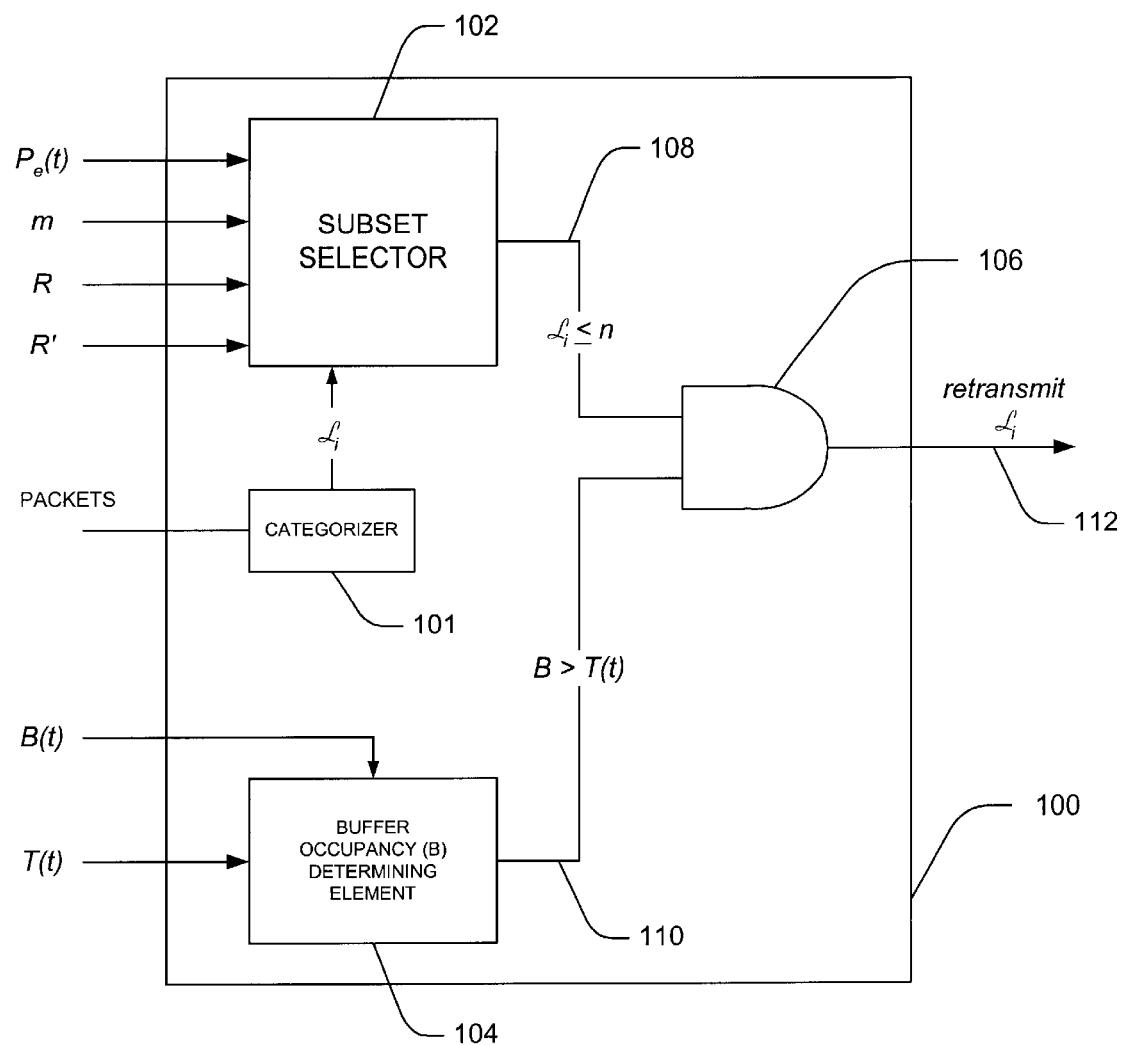
FIG. 1 is a block diagram of a retransmission requesting system in accordance with an embodiment of the present invention.

In recognition of the above-described problems with retransmission of packet data, the present invention discloses a method and system for adaptive selective retransmission of packet data. In one aspect, the method/system involves categorizing or ranking the groups of data packets from the most important to the least important. In an alternative aspect, the method/system includes separating or segmenting the groups of data packets into important and non-important groups. The method/system may also involve adaptively selecting the groups of packets to be retransmitted depending on the network situation and local buffer size. The term "important group" may be defined as a group of data packets that may adversely affect the reconstruction of data if the packets are lost or corrupted. Consequently for purposes of illustration and not for purposes of limitation, the exemplary embodiments of the invention are described in a manner consistent with such use, though clearly the invention is not so limited.

When retransmission is utilized in a data transmission system, an expression for throughput may reduce to:

$$\tilde{R} = \frac{1}{1 + \sum_{i=1}^{L} P_e^i(t)} R, \quad (1)$$

where $\tilde{R}$ is the data rate after L retransmissions. This is sometimes referred to as an actual throughput. R is the ideal data rate, and L is the maximum number of retransmissions allowed. The maximum number of retransmissions allowed (L) may be restricted by a maximum delay. Furthermore, $P_e(t)$ is the packet error rate, which may vary according to the network condition or traffic. The packet error rate is a function of time because network condition may vary as a function of time. The term "error" in the packet error rate may be defined either as a corruption or loss.

Assuming that R' is the rate of data transmitted from the source to the destination node (actual data rate), congestion may occur when $R' > \tilde{R}$. Thus, this condition indicates that the channel congestion may occur when the actual data rate is faster than the actual throughput. Substituting equation (1) for $\tilde{R}$, this channel congestion condition may be expressed as follows:

$$R' > \frac{1}{1 + \sum_{i=1}^{L} P_e^i(t)} R. \quad (2)$$

By rearranging, equation (2) may be expressed as $$\sum_{i=1}^{L} P_e^i(t) > \frac{R}{R'} - 1. \quad (3)$$

Alternatively, the congestion may be avoided if $$\sum_{i=1}^{L} P_e^i(t) \leq \frac{R}{R'} - 1. \quad (4)$$

Therefore, the present system may be arranged to categorize the groups of packets based on equation (4). The system may allow only selected groups of the corrupted (or lost) packets to be given the privilege to request for retransmission.

Accordingly, the present system may be designed as follows. The design may address the problem of degradation of throughput due to retransmission.

Assume only n out of m groups of data packets have the privilege to request for retransmission (n<m). Equation (1) may then be expressed as follows $$\tilde{R} = \frac{1}{1 + \sum_{i=1}^{L} \left( \sum_{j=1}^{n} f_j P_e(t) \right)^i} R, \quad (5)$$

where $f_j$ ($0 \leq j \leq n$) is the fraction of group j packets that has the privilege to request for retransmission, and $$\sum_{j=1}^{m} f_j \leq 1.$$

As stated above, the condition $R' \leq \tilde{R}$ avoids congestion. Thus, by substituting equation (5) into this condition and rearranging, the channel congestion condition may be expressed as $$\sum_{i=1}^{L} \left( \sum_{j=1}^{n} f_j P_e(t) \right)^i \leq \frac{R}{R'} - 1. \quad (6)$$

Equation (6) may then be simplified as follows:

$$\sum_{i=1}^{L} (g_n P_e(t))^i \leq \frac{R}{R'} - 1, \text{ where } g_n = \sum_{j=1}^{n} f_j. \quad (7)$$

The sequence $g_i$ has the following relationship, $g_1 < g_2 < \ldots < (g_m = 1)$.

Since $g_n < 1$ (because n<m) and $P_e(t)$ is a positive number, the condition in equation (7) is easier to meet than the condition in equation (4). Accordingly, following techniques may be utilized to categorize and select the groups of packets.

Although any n groups of packets among m total groups may be selected, it may be desirable to select the n most important groups. Thus in categorizing the packets, a first group of packets may be more important than a second group of packets if the loss of the first group causes more adverse impact than that of the second group in reconstructing the original message.

In certain situations, categorization of groups with different importance may be achieved by signal-to-noise ratio (SNR) scalability. Image and video coding standards, such as JPEG-2000, JPEG, MPEG-4 visual and H.263, have such options. The SNR scalable code divides the codestream into m groups or layers of packets, $\mathcal{A}_1, \mathcal{A}_2, \ldots, \mathcal{A}_m$. The union $$\bigcup_{i=1}^{q} \mathcal{A}_i$$

represents the quality level $Q_q$, $Q_1 < Q_2 < \ldots < Q_m$. The quality of the reconstructed image and video may be improved when more layers are added. Because packets of higher layers may be less useful when decoding if packets of lower layers are lost or corrupted, layer i is considered to be more important than layer j when i<j. To prevent congestion, only packets associated with layers 1 to n are retransmitted. Therefore, n is the largest number satisfying equation (7). Since the packet error rate may vary according to the network condition, the criterion of equation (7) may also vary according to the network condition.

Assuming that each layer has same amount of data, $$g_n = \frac{n}{m}.$$

Therefore, equation (7) may be simplified as $$\sum_{i=1}^{L} \left( \frac{n}{m} P_e(t) \right)^i \leq \frac{R}{R'} - 1. \quad (8)$$

If $$\frac{P_e(t)}{m}$$

is small, the above equation may be further simplified as follows.

$$\frac{n}{m} P_e(t) \leq \frac{R}{R'} - 1. \quad (9)$$

Accordingly, the present system may be designed to retransmit only the corrupted (or lost) n layers of packets where $$n \leq \frac{m}{P_e(t)} \left( \frac{R}{R'} - 1 \right). \quad (10)$$

The present system may further address a round-trip delay problem introduced by retransmission as follows. The present system is arranged so that if the round-trip delay of the retransmission is greater than the buffer occupancy, buffer underflow is indicated. The buffer occupancy is defined as the amount of buffer data (in seconds) needed to reconstruct the original message but not yet present.

Therefore, to prevent such buffer underflow, the second criterion to the design of the present system may be stated as follows.

A corrupted packet may be re-transmitted if $$B(t) > h(t) + G, \quad (11)$$

where B(t) is the buffer occupancy at time t, h(t) is the round-trip time at time t, and G is the guard time to prevent further buffer underflow. Assuming that the delay is symmetric, the round-trip time may be expressed as $$h(t) = h_0 + 2*D(t), \quad (12)$$

where $h_0$ is the normal round-trip time, and D(t) is the one-way delay. By letting $G' = G + h_0$, equation (11) may be expressed as $$B(t) > 2*D(t) + G', \quad (13)$$

Equation (13) may be further simplified as follows $$B(t) > T(t), \quad (14)$$

where $T(t) = 2*D(t) + G'$.

Accordingly, the buffer occupancy condition may be expressed as comparing the buffer occupancy (B(t)) against a threshold value (T(t)), which only depends on the one-way delay (D(t)), the guard time (G), and the normal round-trip time ($h_0$). The delay, D(t), may be time-varying, while the guard time, G, and the round-trip time, $h_0$, may be constants.

FIG. 1 is a block diagram of a retransmission requesting system 100 according to an embodiment of the present invention. The system 100 embodies concepts and designs presented above. Therefore in the illustrated embodiment of FIG. 1, the system 100 is arranged to selectively retransmit groups of packets, according to equation (10) above, if the condition of equation (14) is met. In summary, the requesting system 100 requests network to retransmit the corrupted (or lost) n layers of packets where $$n \leq \frac{m}{P_e(t)}\left(\frac{R}{R'} - 1\right),$$

when B(t)>T(t). These conditions are valid when each layer has same amount of data and $$\frac{P_e(t)}{m}$$

is small. Otherwise when these conditions are not valid, n may be computed by solving for equation (6).

In the illustrated embodiment of FIG. 1, the system 100 includes a categorizer 101, a subset selector 102, a buffer occupancy determining element 104, and a requester 106. The categorizer 101 receives groups of packets, and categorizes them in the order of importance. The order of importance is based on the scope of adverse impact that a loss of a particular group may have on a quality of reconstructed original information.

The subset selector 102 receives each group or layer ($\mathcal{L}_i$) of packets, in the order of importance, and determines whether the particular layer ($\mathcal{L}_i$) belongs to a group that should be given the privilege to be retransmitted. The lower layer number ($\mathcal{L}_i$) indicates more important layer of packets.

The subset selector 102 makes this determination by receiving the packet error rate ($P_e(t)$), the total number of layers (m), the ideal data rate (R), and the actual data rate (R'), and computes the value for $$n_{max} = \frac{m}{P_e(t)}\left(\frac{R}{R'} - 1\right).$$

If the particular layer ($\mathcal{L}_i$) is less than or equal to $n_{max}$, a first retransmit signal 108 is sent to the requester 106.

The buffer occupancy determining element 104 receives a threshold value (T(t)), and sends a second retransmit signal 110 to the requester 106 if the buffer occupancy (B(t)) is greater than this threshold value. When the requester 106 receives both first and second retransmit signals from the subset selector 102 and the buffer occupancy determining element 104, respectively, the requester 106 sends a retransmit layer $\mathcal{L}_i$ signal 112 to the originating node in the network.

There has been disclosed herein a method and system for adaptive selective retransmission of packet data. In one aspect, the method/system involves categorizing the groups of data packets from the most important to the least important. In an alternative aspect, the method/system includes separating or segmenting the groups of data packets into important and non-important groups. The method/system also involves adaptively selecting the groups of packets to be retransmitted depending on the network situation and local buffer size. This method provides advantages that include decreased packet transmission delay and increased overall throughput.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, equation (10), used to select groups of packets for retransmission, may use or include other network condition parameters, in addition to or in place of the parameters in that equation. In other instances, well-known structures and functions were not described in elaborate detail in order to avoid obscuring the subject matter of the present invention. Accordingly, the scope and spirit of the invention should be judged in terms of the claims which follow.

Appendix

EXAMPLE 1

Figure 2:
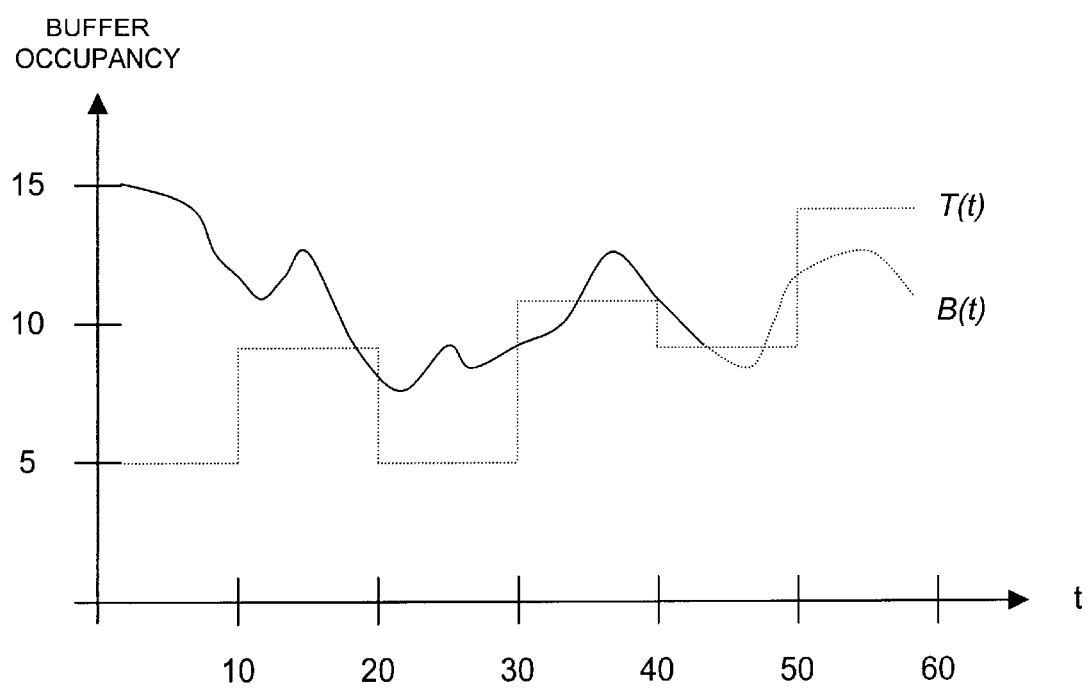
FIG. 2 shows buffer occupancy and threshold values for an example case.

Problem: Assume that a 7.6 kbps codestream is transmitted over an 8 kbps mobile data channel. The codestream is divided into 10 layers by an SNR scalable coder. Each layer has same amount of data. Thus, equation (10) may be used to compute n. The Quality-of-Service (QoS) parameters (e.g. packet error rate and delay) are updated every 10 seconds, as shown in Table 1. The buffer occupancy (B(t)) is as shown in FIG. 2.
  Total number of layers (m)=10.
  Ideal data rate (R)=8 kbps.
  Actual data rate (R')=7.6 kbps.

TABLE 1

Packet error rate and Delay.

| Time (seconds) | Packet error rate | Delay from normal (sec) |
|---|---|---|
| 0–10 | 5% | 0 |
| 10–20 | 10% | 2 |
| 20–30 | 12% | 0 |
| 30–40 | 10% | 3 |
| 40–50 | 7% | 2 |
| 50–60 | 8% | 5 |

Solution: According to equations (10) and (14), a packet is given a privilege to be retransmitted if it belongs to the group n, and the buffer occupancy B(t) is greater than the threshold T(t). The group and threshold may vary according to network condition, as shown in Table 2. A guard time of 5 seconds (G'=5) is assumed.

TABLE 2

Retransmission conditions

| Time (seconds) | n | T(t) |
|---|---|---|
| 0–10 | Layers 1 ... 10 | 5 |
| 10–20 | Layers 1 ... 5 | 9 |
| 20–30 | Layers 1 ... 4 | 5 |
| 30–40 | Layers 1 ... 5 | 11 |
| 40–50 | Layers 1 ... 7 | 9 |
| 50–60 | Layers 1 ... 6 | 15 |

FIG. 2 indicates that the retransmission is not allowed during time periods [18–20], [30–34], [43–47] and [50–60] because B(t)<T(t) during those time periods.

What is claimed is:

1. A method for selectively retransmitting packets, comprising:
  categorizing groups of packets in an order of importance, where the order of importance is based on a scope of adverse impact that a loss of a particular group has on a quality of reconstructed original information;
  selecting a subset of said groups of packets to be retransmitted, said selecting based on network condition parameters; and
  requesting retransmission of the subset of said groups of packets.

2. The method of claim 1, wherein said network condition parameters include ideal and actual data rates.

3. The method of claim 1, wherein said network condition parameters include a packet error rate.

4. The method of claim 1, wherein said network condition parameters include a total number of groups of packets.

5. The method of claim 1, wherein a lower group number indicates higher order of importance.

6. The method of claim 5, wherein said network condition parameters include ideal (R) and actual data rates (R'), a packet error rate ($P_e(t)$), and a total number of groups of packets (m).

7. The method of claim 6, wherein the subset of said groups of packets include groups of packets sufficiently important to be given a privilege to request retransmission.

8. The method of claim 7 wherein said selecting the subset of said groups of packets includes computing $n_{max}$, where $$n_{max} = \frac{m}{P_e(t)}\left(\frac{R}{R'} - 1\right),$$

and including the particular group in the subset if a group number of the particular group is less than or equal to $n_{max}$.

9. The method of claim 1, wherein retransmission of the subset of said groups of packets is requested when a buffer occupancy condition is met.

10. The method of claim 9, wherein said buffer occupancy condition is met when buffer occupancy is greater than a threshold value.

11. The method of claim 10, wherein said threshold value is approximately equal to a round-trip delay plus a guard time.

12. The method of claim 11, wherein said round-trip delay is two times one-way delay.

13. A system for selectively retransmitting packets, comprising:
  means for categorizing groups of packets in an order of importance, where the order of importance is based on a scope of adverse impact that a loss of a particular group has on a quality of reconstructed original information;
  means for selecting a subset of said groups of packets to be retransmitted, said selecting based on network condition parameters; and
  means for requesting retransmission of the subset of said groups of packets when a buffer occupancy condition is met.

14. The system of claim 13, wherein said means for selecting the subset of said groups of packets includes:
  a computation element for computing $$n_{max} = \frac{m}{P_e(t)}\left(\frac{R}{R'} - 1\right),$$

where R is an ideal data rate, R' is an actual data rate, $P_e(t)$ is a packet error rate, and m is a total number of groups of packets, and
  a sorting element for including the particular group in the subset if a group number of the particular group is less than or equal to $n_{max}$, where a lower group number indicates higher order of importance.

15. A system for selectively retransmitting packets, comprising:
  a categorizer to receive groups of packets, said categorizer to sort the groups of packets in an order of importance, where the order of importance is based on a scope of adverse impact that a loss of a particular group may have on a quality of reconstructed original information; and
  a subset selector to receive each group of packets sorted in the order of importance, said selector to determine whether a particular group is sufficiently important to be retransmitted.

16. The system of claim 15, further comprising:
a buffer occupancy determining element to generate a request to retransmit the particular group determined to be sufficiently important when buffer occupancy is greater than a threshold value.

17. The system of claim 16, further comprising:
a requester to send the request to retransmit the particular group of packets.

18. The system of claim 15, wherein said subset selector determines whether a particular group is sufficiently important to be retransmitted by computing $$n_{\max} = \frac{m}{P_e(t)}\left(\frac{R}{R'} - 1\right),$$

where R is an ideal data rate, R' is an actual data rate, $P_e(t)$ is a packet error rate, and m is a total number of groups of packets, and including the particular group in a sufficiently important subset if a group number of the particular group is less than or equal to $n_{max}$, where a lower group number indicates higher order of importance.

19. A system for selectively retransmitting packets, comprising:

a subset selector receiving each group of packets sorted in an order of importance, said selector operating to determine whether a particular group is sufficiently important to be retransmitted; and a buffer occupancy determining element sending a request to retransmit the particular group determined to be sufficiently important when buffer occupancy is greater than a threshold value.

20. The system of claim 19, further comprising:

a categorizer receiving groups of packets, said categorizer to categorize the groups of packets in the order of importance, where the order of importance is based on a scope of adverse impact that a loss of a particular group may have on a quality of reconstructed original information.

* * * * *